US012760586B2

(12) United States Patent
Sato et al.

(10) Patent No.: US 12,760,586 B2
(45) Date of Patent: Oct. 13, 2026

(54) INTEGRATING COMMUNICATION LINES INTO PROFILES

(71) Applicant: ARCONIC TECHNOLOGIES LLC, Pittsburgh, PA (US)

(72) Inventors: Lester Taku Sato, Liverpool (GB); Fraser Lewins, Runcorn (GB); Jeremy Davies, Warrington (GB); Ion-Horatiu Barbulescu, Marietta, GA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 283 days.

(21) Appl. No.: 18/337,287

(22) Filed: Jun. 19, 2023

(65) Prior Publication Data

US 2024/0084931 A1 Mar. 14, 2024

Related U.S. Application Data

(60) Provisional application No. 63/353,744, filed on Jun. 20, 2022.

(51) Int. Cl.

| | |
|---|---|
| ***E06B 3/04*** | (2006.01) |
| ***E06B 1/52*** | (2006.01) |
| *F16L 3/04* | (2006.01) |
| *F16L 3/223* | (2006.01) |
| *F16L 3/24* | (2006.01) |

(52) U.S. Cl.

CPC ................ *E06B 3/04* (2013.01); *E06B 1/528* (2013.01); *F16L 3/04* (2013.01); *F16L 3/2235* (2013.01); *F16L 3/243* (2019.08)

(58) Field of Classification Search

CPC ........ E06B 3/04; E06B 3/26303; E06B 3/528; E06B 2003/26387

See application file for complete search history.

(56) References Cited

U.S. PATENT DOCUMENTS

| | | | | | |
|---|---|---|---|---|---|
| 4,534,147 | A * | 8/1985 | Cristell | H02G 3/0431 | 174/68.3 |
| 6,274,817 | B1 * | 8/2001 | Jaakkola | H01R 25/14 | 174/99 R |
| 2008/0256893 | A1 * | 10/2008 | Siodla | E06B 3/26305 | 52/717.01 |
| 2018/0146798 | A1 * | 5/2018 | Artwohl | F25D 21/04 | |

(Continued)

FOREIGN PATENT DOCUMENTS

| | | | | | |
|---|---|---|---|---|---|
| AT | 516256 | B1 * | 4/2016 | E06B 1/528 |
| DE | 102013100715 | B3 | 2/2014 | |
| DE | 102018110139 | A1 * | 10/2019 | |

(Continued)

OTHER PUBLICATIONS

EP Search Report from corresponding EP Application No. 23179800 mailed Nov. 16, 20213.

*Primary Examiner* — Christine T Cajilig

(74) *Attorney, Agent, or Firm* — Vorys, Sater, Seymour and Pease LLP

(57) ABSTRACT

A profile for a fenestration system includes a first portion and a second portion offset from the first portion and thereby defining an inner space therebetween. The profile for a fenestration system further includes a retention mechanism arranged within the inner space, and one or more communication lines mounted to the retention mechanism.

19 Claims, 5 Drawing Sheets

(56) References Cited

U.S. PATENT DOCUMENTS

| | | | | |
|---|---|---|---|---|
| 2019/0267933 | A1* | 8/2019 | Janowski | E06B 9/24 |
| 2019/0284866 | A1* | 9/2019 | Marinack, Jr. | E06B 3/26305 |

FOREIGN PATENT DOCUMENTS

| | | | | | |
|---|---|---|---|---|---|
| DE | 102018129883 | A1 | | 5/2020 | |
| DE | 102019003336 | A1 | * | 11/2020 | E05D 5/0238 |
| EP | 0828053 | A2 | * | 3/1998 | |
| EP | 2532823 | A1 | * | 12/2012 | E06B 3/26303 |
| EP | 2559838 | A2 | * | 2/2013 | E06B 3/26303 |
| FR | 3073246 | A1 | | 5/2019 | |

* cited by examiner

INTEGRATING COMMUNICATION LINES INTO PROFILES

BACKGROUND

Recent advances in technology have spurred interest in applying functionality to everyday objects that have historically been passive, thus generating a new generation of "smart" or "active" systems. The fenestration industry, which includes the manufacture, installation, and arrangement of doors, windows, and curtain wall systems in commercial and residential buildings, is no different. Advances in technology have fostered ideas directed to fenestration assemblies, such as motorization and automation of doors and windows, electrochromic glass, integration of sensors (e.g., closed loop feedback for $CO_2$ and oxygen levels within a building environment, window and door status, etc.), enhanced security and monitoring options, real-time status checks on a building envelope, and many more.

With the growth in smart and active systems, requirements for wiring or cable routing and electrical connections between profiles of fenestration system doors and windows will only increase. At a basic level, conventional aluminum profiles for doors and windows lend themselves to cable routing with large voids running along the length of the profile where there is ample space for cables to be routed. However, cable routing is largely carried out on site, including all associated preparations, by which time it is often not possible to access some of the profile voids as the profiles/frames will have been previously assembled by the fabricator. Therefore, routing cables and wiring onsite is often limited to the glazing area and beading for windows, which can be crowded and difficult to route a cable while allowing space for glass packers, insulation, and any required fixings. Moreover, this option is not even possible on wrap-around systems.

To mitigate the risk of short circuits occurring, it is also important that fenestration system cabling be not placed along a drainage path. This also prevents interference with water tightness as the wires can act as a water migration path through capillary action and lead to short circuits at any connectors or junctions.

SUMMARY OF THE DISCLOSURE

Embodiments disclosed herein include a profile for a fenestration system that includes a first portion and a second portion offset from the first portion and thereby defining an inner space therebetween, a retention mechanism arranged within the inner space, and one or more communication lines mounted to the retention mechanism. In a further embodiment, the first portion is an exterior portion exposed to an exterior of a building, and wherein the second portion is an interior portion exposed to an interior of the building, and wherein the retention mechanism comprises a thermal break that includes an elongate base body extending between and interconnecting the first and second portions, a cap attachable to the body, and a cavity defined between the body and the cap when the cap is attached to the body, wherein the one or more communication lines are housed within the cavity. In another further embodiment, the profile includes a pivot mechanism provided at a first end of the cap to pivotably attach the cap to the body. In another further embodiment, the pivot mechanism comprises a living hinge. In another further embodiment, the profile includes an attachment mechanism provided at a second end of the cap, wherein the attachment mechanism detachably couples the cap to the body. In another further embodiment, a top face of the cap aligns with a top face of an adjacent portion of at least one of the first and second portions. In another further embodiment, the profile includes one or more grooves defined in the body within the cavity, the one or more grooves being sized to receive and accommodate the one or more communication lines. In another further embodiment, at least one of the grooves provides an opening that narrows to retain the one or more communication lines within the at least one of the grooves. In another further embodiment, at least one of the grooves narrows as it extends into the body. In another further embodiment, the profile includes one or more protrusions defined in the body opposite the one or more grooves. In another further embodiment, the profile includes first and second attachment mechanisms provided at opposing ends of the cap to detachably couple the cap to the body. In another further embodiment, the cap is made of a material different from the body. In another further embodiment, the profile includes one or more grooves defined in the cap within the cavity, the one or more grooves being sized to receive and accommodate the one or more communication lines. In another further embodiment, at least one of the grooves provides an opening that narrows to retain the wire within the at least one of the grooves. In another further embodiment, at least one of the grooves narrows as it extends into the body. In another further embodiment, the first portion is a vent portion for enclosing a building envelope, and the second portion is a frame portion for mating the first portion to the building envelope, and wherein the retention mechanism comprises a thermal shield that includes an elongate body extending across a width of the profile and attached to the first portion or the second portion, and a cavity defined within the elongate body, wherein the one or more communication lines are housed within the cavity. In another further embodiment, the cavity is a first cavity, and wherein the first cavity is in communication with a second cavity defined within the elongate body and sized to receive a gasket.

Embodiments disclosed herein may further include a method of converting a profile for a fenestration system to an active profile, the method may include providing the profile, which includes a first portion and a second portion offset from the first portion and thereby defining an inner space therebetween, and mounting one or more communication lines to a retention mechanism arranged within the inner space. The method may further include, wherein the first portion is an exterior portion exposed to an exterior of a building, and wherein the second portion is an interior portion exposed to an interior of the building, and wherein the retention mechanism comprises a thermal break including an elongate base body extending between and interconnecting the first and second portions, a cap attachable to the body, and a cavity defined between the body and the cap when the cap is attached to the body, and wherein mounting one or more communication lines to the retention mechanism comprises housing the one or more communication lines within the cavity. The method may further include wherein the first portion is a vent portion for enclosing a building envelope, and the second portion is a frame portion for mating the first portion to the building envelope, and wherein the retention mechanism comprises a thermal shield including an elongate body extending across a width of the profile and attached to the first portion or the second portion, and a cavity defined within the elongate body, and wherein mounting one or more communication lines to the retention mechanism comprises housing the one or more communication lines within the cavity.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is directed to fenestration systems and, more particularly, to integrating wires and cabling directly into the profiles of fenestration system doors and windows, thus eliminating the need for onsite cabling where sensors, motors, active glass, "smart" systems, and any non-smart systems requiring cabling will be incorporated.

The principles of the present disclosure simplify the installation and connection of fenestration system parts that require electrical connections, whether for communications or power, and address problems associated with cabling through fenestration system profiles onsite. The principles of the present disclosure are predicated on the idea that fenestration system profiles for windows, doors, or curtain wall systems can be either active or passive. A passive profile is a standard profile provided onsite without wiring or cabling, and generally not configured for such wiring or cabling. With passive profiles, an installer would have to route appropriate cabling to support a "smart" system, which could require significant alteration (e.g., creation of holes, etc.) of the profile. An active profile is a profile that includes suitable wiring or cabling pre-installed by the fabricator or manufacturer or otherwise configured to receive the wiring or cabling on-site. Active profiles eliminate the need for onsite cabling by the installer, and active profiles can be used to convert a passive fenestration system into a "smart" system.

Figure 1:
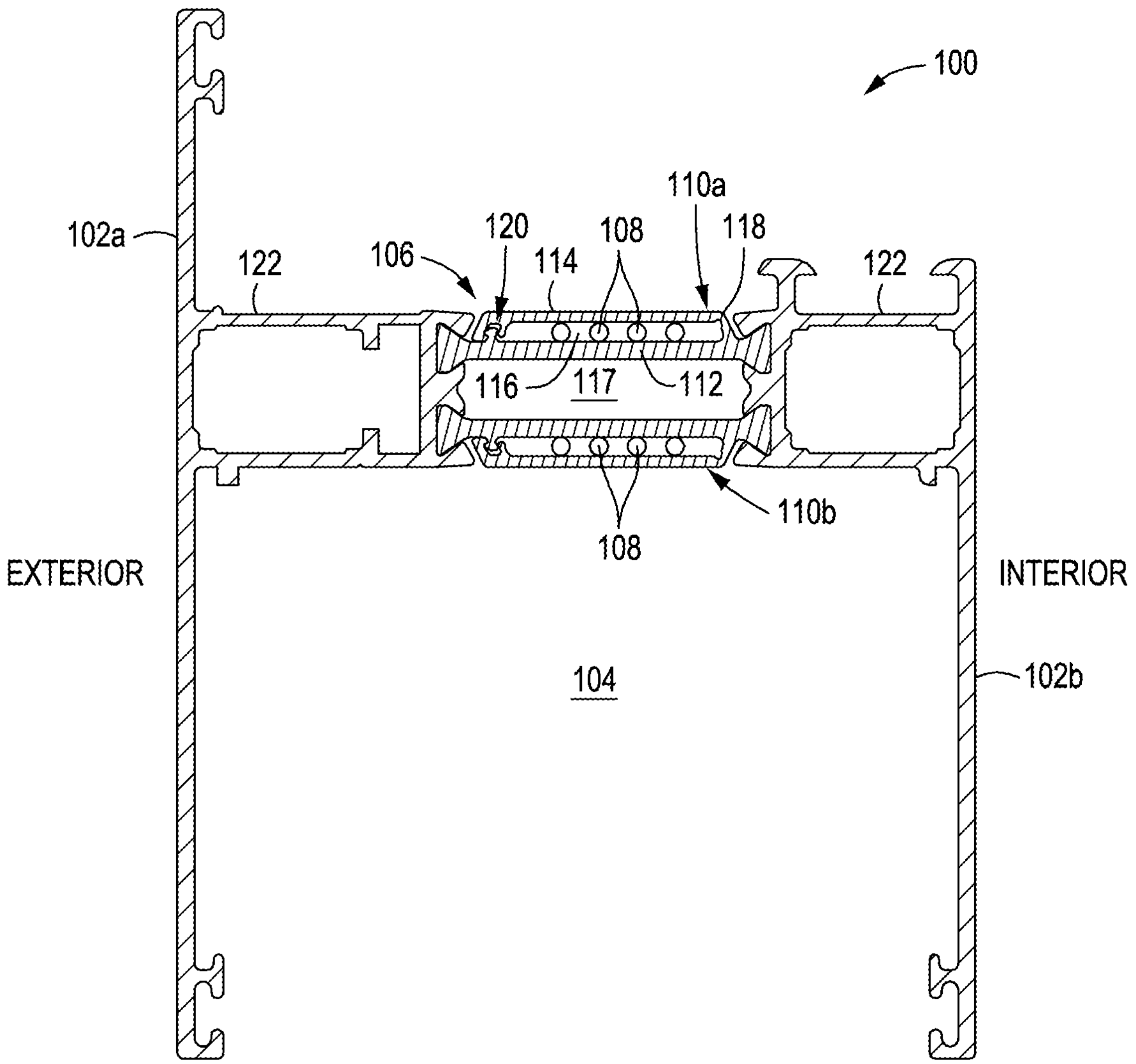
FIG. 1 is a cross-section view of an example profile, according to one or more embodiments.

FIG. 1 is a cross-section view of an example fenestration profile 100, according to one or more embodiments. The fenestration profile 100 (hereafter the "profile 100") may form part of or otherwise be incorporated into any type of commercial or residential fenestration system including, but not limited to, windows, doors, curtain wall assemblies, conservatories, balconies, glazed roofing systems, sliding doors and windows, or any combination thereof. The profile 100 may be a designed to be oriented vertically, horizontally, or at any angle therebetween.

The profile 100 may comprise a rigid extrusion made of aluminum, an aluminum alloy, or other metals and metal alloys. As illustrated, the profile 100 can include a first or "exterior" portion 102*a* intended to be generally exposed to the exterior of a building, and a second or "interior" portion 102*b* intended to be generally exposed to the interior of the building. In other embodiments, the profile 100 may further include a third or $n^{th}$ "intermediate" portion (not shown) that interposes the exterior and interior portions 102*a,b*.

The exterior and interior portions 102*a,b* cooperatively define an inner space 104 for accommodating an infill of a given thickness that could be, but is not limited to, glass, a foam panel, or a structural connection to another profile. The inner space 104 generally extends along the entire length of the profile 100.

According to embodiments of the present disclosure, a retention and/or protection mechanism 106 may be arranged within the inner space 104 and secured to the profile 100. The retention mechanism 106 may be configured to secure and otherwise house one or more communication lines 108 extending within (through) the profile 100. The communication lines 108 may comprise a variety of means for transmitting electrical power, signals, and data. In some embodiments, for example, one or more of the communication lines 108 may comprise an electrical wire, such as a solid, elongate piece of copper or another conductive metal or material. In other embodiments, one or more of the communication lines 108 may comprise an electrical cable, which may comprise an assembly of one or more wires running side by side, bundled, or wound together. In yet other embodiments, one or more of the communication lines 108 may comprise one or more fiber optic cables.

The retention mechanism 106 may comprise any rigid or semi-rigid device or structure capable of being secured to the profile 100 within the inner space 104. In the illustrated embodiment, the retention mechanism 106 is secured to and extends between the exterior and interior portions 102*a,b*. As illustrated, opposing ends of the retention mechanism 106 are secured to the exterior and interior portions 102*a,b* via a crimped or dovetail engagement, but could alternatively be secured thereto in other ways, without departing from the scope of the disclosure.

In the illustrated embodiment, the retention mechanism 106 comprises and dualistically (jointly) operates as a thermal break extending between and interconnecting the exterior and interior portions 102*a,b*. The thermal break serves to improve thermal performance of the profile 100 by preventing thermal energy loss between the exterior and interior portions 102*a,b* and in some cases providing mechanical strength. The thermal break may be made of one or more materials having a thermal conductivity that is less than the thermal conductivity of the profile 100, such as a polyurethane foam, polyethylene terephthalate (PET), polyamide, acrylonitrile butadiene styrene (ABS), a polymer, or the like.

For purposes of discussion, the retention mechanism 106 will be referred to herein as the "thermal break 106", with the understanding that it operates jointly as a thermal break and a structural component configured to retain the communication lines 108. In the illustrated embodiment, the thermal break 106 comprises a first or "upper" portion 110*a* and a second or "lower" portion 110*b* offset from the first portion 110*a* by a short distance (gap). In some embodiments, the first and second portions 110*a,b* may be entirely separate from each other, but could alternatively be connected at one or more locations. In embodiments where they are entirely separate, the first and second portions 110*a,b* may be substantially similar in design and architecture. In at least one embodiment, the thermal break 106 may include only one of the portions 110*a,b*. Consequently, the following discussion of the first portion 110*a* may be equally applicable to the second portion 110*b* or alternatively to the thermal break 106 as a whole.

As illustrated, the thermal break 106 includes an elongate base body 112 that extends between and interconnects the exterior and interior portions 102*a,b* (e.g., via a dovetail crimp). The width of the body 112 (e.g., lateral length extending between the exterior and interior portions 102*a,b*) can vary, depending on the application. The thermal break 106 further includes a cap 114 attached or attachable to the body 112. When the cap 114 is attached to the body 112, a cavity 116 is defined between the body 112 and the cap 114, and the cavity 116 may be sized to accommodate the communication lines 108 therein. While four communication lines 108 are shown arranged within the cavity 116, more or less than four may be included, without departing from the scope of the disclosure.

While not shown, in at least one embodiment, the communication lines 108 may be positioned within an area 117 or cavity defined between the first and second portions 110*a,b*.

In the illustrated embodiment, a first end of the cap 114 includes a pivot mechanism 118 that pivotably attaches the cap 114 to the body 112. In some embodiments, the pivot mechanism 118 may comprise a living hinge, also referred to as an "integral" hinge, which may be a thinned or cut portion of the material that allows the cap 114 to bend and pivot relative to the body 112. In such embodiments, the pivot mechanism 118 may be made from the same material as the body 112 and the cap 114. In other embodiments, however, the pivot mechanism 118 may comprise any other type of pivoting mechanism or device that allows the cap 114 to pivot relative to the body 112, such as, but not limited to, a mechanical hinge (e.g., mating pin and aperture combination) or the like.

The opposite end of the cap 114 includes an attachment mechanism 120 that detachably couples the cap 114 to the body 112. In the illustrated embodiment, the attachment mechanism 120 comprises a channel defined by the cap 114 and configured to mate with a protrusion extending from the body 112 in a snap-fit engagement. As will be appreciated, in other embodiments, the channel may alternatively be defined by the body 112 and the protrusion may be defined by the 114. Upon mating the channel with the protrusion, the attachment mechanism 120 prevents inadvertent separation of the cap 114 from the body 112 without sufficient force to uncouple the two components.

In other embodiments, however, the attachment mechanism 120 may comprise any other type of attachment means that allows the cap 114 to be detachably coupled to the body 112. Other examples of the attachment mechanism 120 include, but are not limited to, a magnetic attachment, an adhesive (e.g., adhesive tape, self-sealing tape, etc.), an interference fit, a welded interface (e.g., laser or ultrasonic welding), a hook and loop fastener (e.g., Velcro®), a spring loaded hinge at the pivot mechanism 118, encapsulation, or any combination of the foregoing.

In some embodiments, when the cap 114 is properly attached to the body 112, the upper or top face of the cap 114 may not extend above the upper or top face 122 (or bottom face for that matter) of adjacent portions of the exterior and interior portions 102*a,b*. Rather, as shown in FIG. 1, the top face of the cap 114 may be substantially aligned with one or both of the top faces 122 of the adjacent portions of the exterior and interior portions 102*a,b*. This may prove advantageous since various parts or components of the fenestration system may be placed within the inner space 104 and oftentimes require a flat surface to rest on. This may also prove advantageous to help promote proper water drainage from the inner space 104. Whereas, if the top face of the cap 114 was misaligned with the adjacent faces 122 of the exterior and interior portions 102*a,b*, water may tend to pool in unintended locations within the inner space 104.

In some embodiments, when the cap 114 is properly attached to the body 112, the cap 114 may substantially prevent the migration of water and moisture into the cavity 116 and thereby help protect the communication lines 108 from inadvertent short-circuiting. Accordingly, in at least one embodiment, the cap 114 may be sealed to the body 112 at the attachment mechanisms 120. Moreover, arranging the wires within the cavity 116 upon manufacture of the profile 100 reduces the need for cable routing onsite by the installer. Accordingly, the profile 100 can be supplied to the job site installer with the communication lines 108 already integrated into the retention mechanism 106 (thermal break 106), thus reducing installation time.

FIGS. 2A-2D depict additional example embodiments of the retention mechanism 106 or "thermal break" of FIG. 1. The thermal break 106 shown in FIGS. 2A-2D may be similar in some respects to the thermal break 106 of FIG. 1, where like numerals represent similar component parts that will not be described again in detail. Similar to the embodiment shown in FIG. 1, each thermal break 106 of FIGS. 2A-2D includes the body 112 and the cap 114 pivotably coupled to the body 112 at the pivot mechanism 118. Moreover, the cap 114 may be detachably coupled to the body 112 via the attachment mechanism 120, as generally described above.

Unlike the embodiment of FIG. 1, however, the thermal breaks 106 of FIGS. 2A-2D include one or more retention channels or "grooves" 202 defined in the body 112 within the cavity 116. The grooves 202 may be sized to receive and accommodate the communication lines 108 (FIG. 1). Accordingly, in some embodiments, the number of grooves 202 may match the number of communication lines 108 included in the application, but the number of communication lines 108 may alternatively by smaller than the number of grooves 202, without departing from the scope of the disclosure. The grooves 202 may prove advantageous in placing and aligning the communication lines 108 within the cavity 116.

Figure 2A:
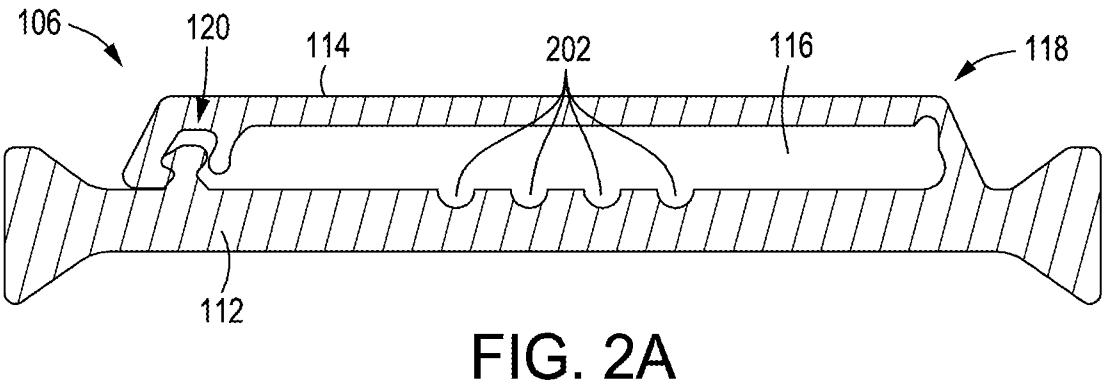
FIGS. 2A-2D depict additional example embodiments of the thermal break of FIG. 1.
Figure 2B:
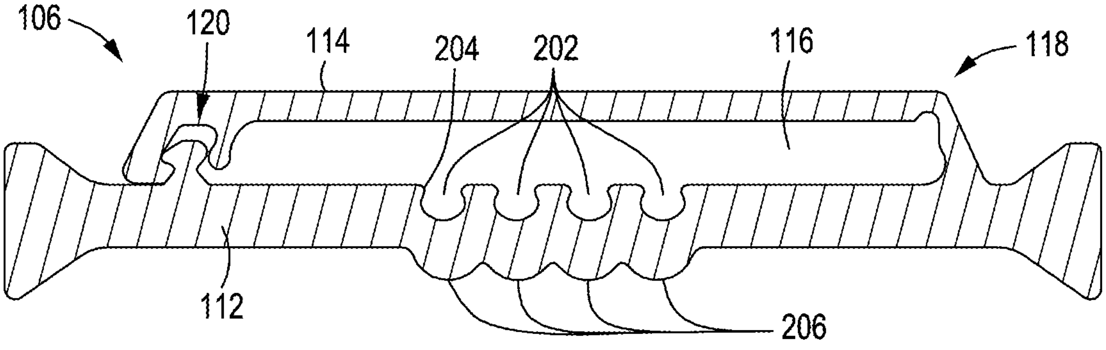

In FIG. 2B, the grooves 202 are defined deeper into the material of the body 112, and an opening 204 to one or more of the grooves 202 may be narrowed to help retain the communication line 108 within the corresponding groove 202. In such embodiments, the communication lines 108 may need to be forced through the opening(s) 204 and will be retained within the grooves 202 regardless of orientation of the thermal break 106. Moreover, in such embodiments, the cap 114 may be omitted from the thermal break 106.

In some embodiments, one or more protuberances or protrusions 206 are defined opposite the grooves 202 on the opposing side of the body 112. Since the grooves 202 remove a portion of the material of the body 112, the protrusions 206 serve to replace at least a portion of removed material and thereby help maintain the rigidity and moment of inertia of the thermal break 106. Further, the protrusions 206 may reinforce the portions of the body 112 surrounding the grooves 202 to prevent deformation or destruction of the body 112 in these thinned or thinner areas.

Figure 2C:
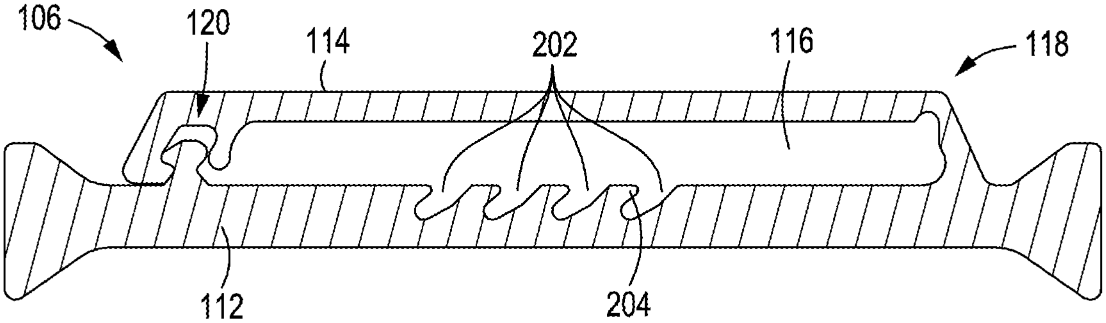

In FIG. 2C, the size (e.g., width) of one or more of the grooves 202 narrows as it extends into the body 112. This may prove advantageous in allowing the grooves 202 to receive and secure different gauges (sizes) of communication lines 108 needing to be retained within the cavity 116. The grooves 202 in FIG. 2C may help form a friction (interference) fit with the communication lines 108. Further, the grooves 202 extend into the body 112 at an angle offset from perpendicular, thereby defining an opening 204 that overhangs or extends over a portion of the groove 202. This overhanging opening 204 may require a lateral force to unseat the retained communication lines 108.

Figure 2D:
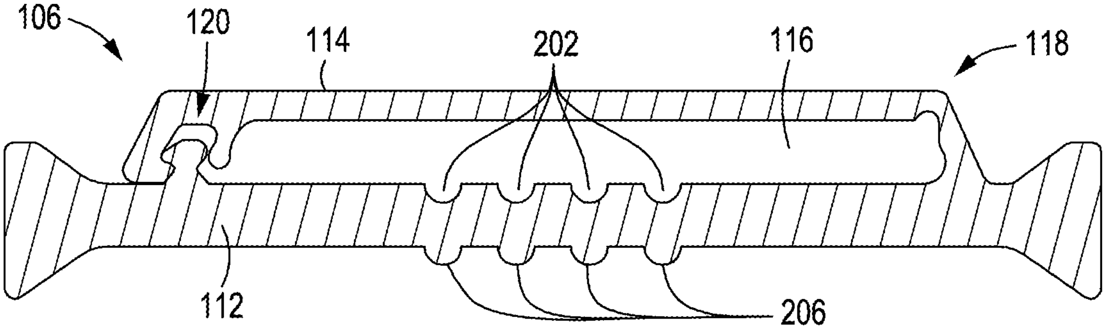

FIG. 2D depicts another example of the thermal break 106, which includes protrusions 206 defined in the body 112 opposite the grooves 202. As mentioned above, such protrusions help maintain the rigidity and moment of inertia of the thermal break 106.

Figure 3A:
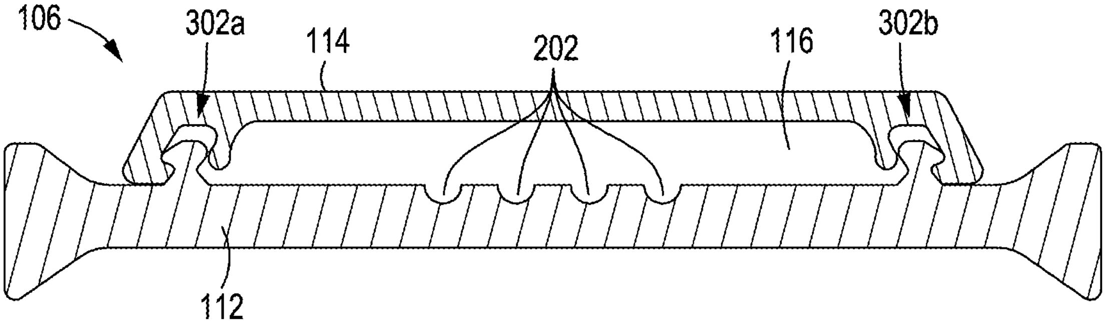
FIGS. 3A-3C depict additional example embodiments of the thermal break of FIG. 1.
Figure 3B:
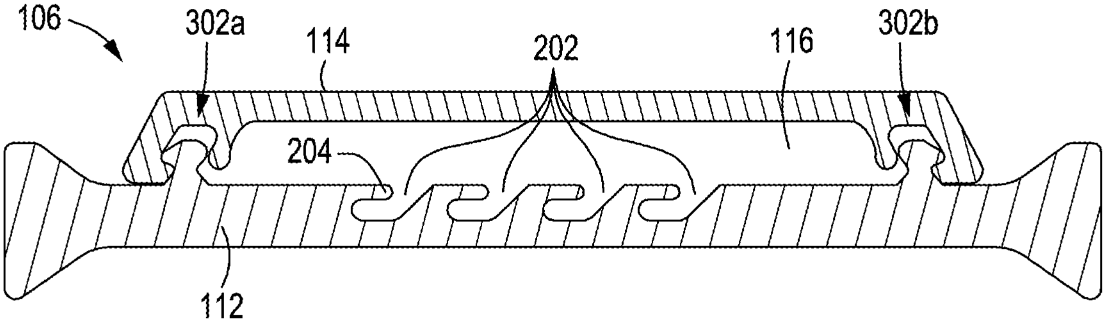
Figure 3C:
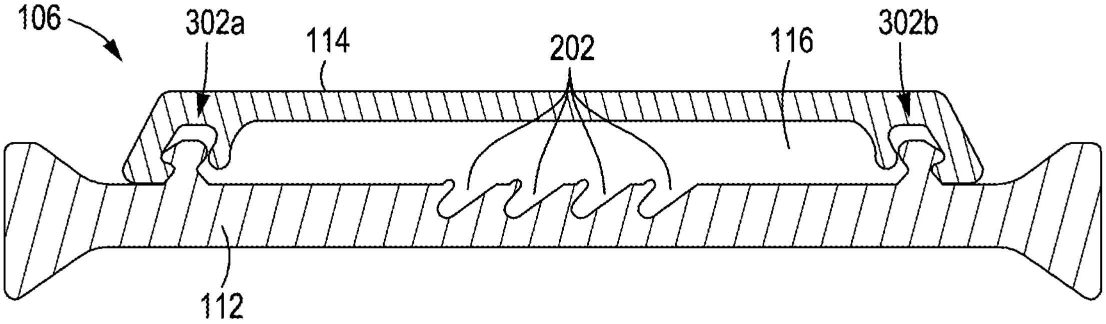

FIGS. 3A-3C depict additional example embodiments of the thermal break 106 of FIG. 1. The thermal break 106 shown in FIGS. 3A-3C may be similar in some respects to the thermal break 106 of FIG. 1 and the thermal breaks 106 of FIGS. 2A-2D, where like numerals represent similar component parts that will not be described again in detail. Similar to the embodiments shown in FIGS. 1 and 2A-2D, the thermal breaks 106 of FIGS. 3A-3C include the body 112 and the cap 114, and one or more grooves 202 may be defined in the body 112 within the cavity 116 to receive and accommodate communication lines 108 (FIG. 1).

Unlike the embodiments of FIGS. 1 and 2A-2D, however, the cap 114 is not pivotably coupled to the body 112, but rather fully detachable from the body 112. More specifically, the thermal breaks 106 of FIGS. 3A-3C include a first attachment mechanism 302*a* at one end of the cap 114, and a second attachment mechanism 302*b* at the opposing end of the cap 114. The attachment mechanisms 302*a,b* may be the same as or similar to the attachment mechanism 120 of FIG. 1 and, therefore, may include a protrusion extending from either the body 112 or the cap 114 and configured to mate with a channel defined by the other of the cap 114 or the body 112 in a snap-fit engagement. Moreover, the attachment mechanisms 302*a,b* may alternatively comprise any of the other types of attachment means mentioned herein that allow the cap 114 to be detachably or permanently coupled to the body 112. Upon mating the cap 114 to the body 112 at the attachment mechanisms 302*a,b*, the cap 114 will be prevented from inadvertently separating from the body 112 without sufficient force to uncouple the two components.

In the embodiments of FIGS. 3A-3C, the cap 114 may be made of a material that is different from the body 112. In such embodiments, the cap 114 may be made of a material that exhibits a thermal conductivity that is less than or equal to the thermal conductivity of the body 112. The cap 114 could be made of foam or a foam material that holds the wires and is stuck on to the body 112, for example. At least one advantage of having the cap 114 made of a material different from the body 112 is the cost benefit and ease of integration of the communication lines 108 (FIG. 1).

In FIG. 3B, the grooves 202 comprise a channel with an opening 204 that defines an overhang, which may help retain communication lines 108 (FIG. 1) within the grooves 202. Further, the overhanging opening 204 may additionally require a lateral force to unseat the retained communication lines 108. The additionally required force for unseating the communication lines 208 may further reduce accidental unseating and improve stability of the communication lines 208 during installation and operation.

Figure 4A:
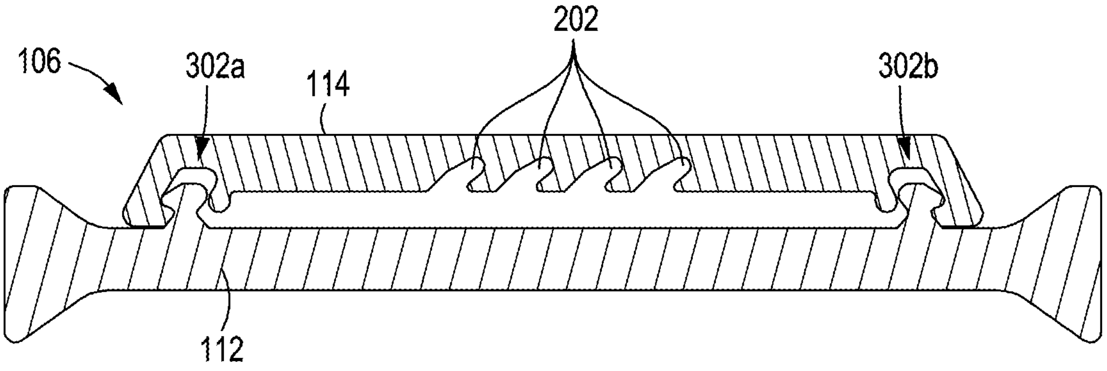
FIGS. 4A and 4B depict additional example embodiments of the thermal break of FIG. 1.
Figure 4B:
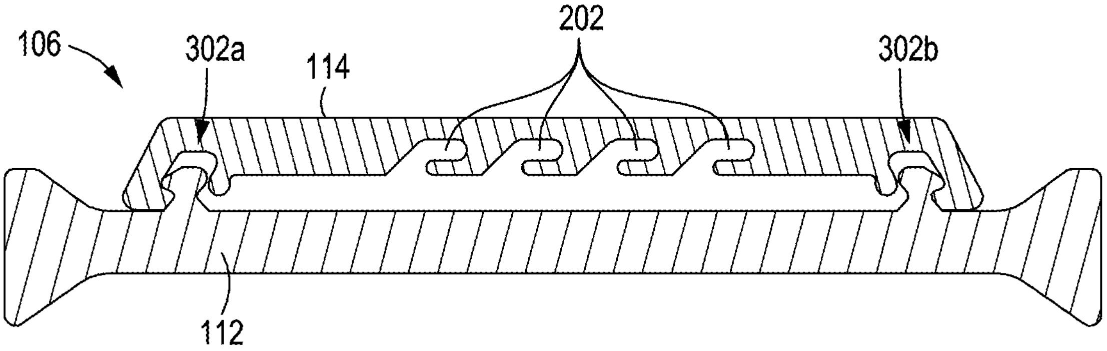

FIGS. 4A and 4B depict additional example embodiments of the thermal break 106 of FIG. 1. The thermal break 106 shown in FIGS. 4A-4B may be similar in some respects to the thermal break 106 of FIG. 1 and the thermal breaks 106 of FIGS. 3A-3C, where like numerals represent similar component parts that will not be described again in detail. Similar to the embodiments shown in FIGS. 1 and 3A-3C, the thermal breaks 106 of FIGS. 4A-4B include the body 112 and the cap 114, and the cap 114 is fully detachable from the body 112 at the first and second attachment mechanisms 302*a,b*.

Unlike the embodiments of FIGS. 1 and 3A-3C however, the grooves 202 are not defined in the body 112, but are instead defined in the detachable cap 114. This may prove advantageous in allowing the communication lines 108 (FIG. 1) to be pre-installed in the cap 114, and cap 114 can then be attached to any body 112 of any profile 100 (FIG. 1) required to be active, which can dramatically simplify stocking. In addition, the cap 114 can be detached from the body 112 after the profile 100 is rolled and/or painted, and the communication lines 108 can then be secured to the cap 114. Another advantage is that connection through the cap 114 is simplified as the communication lines 108 are in the cap 114, and by placing the communication lines 108 in the cap 114, they can be easily accessed through the cap 114, which results in having only one layer to be prepped to create a connection point. In other words, accessing or exposing the communication lines 108 may be simpler in this embodiment. Further, this embodiment may help with the ease of manufacturing, since it is easier to manufacture the cap 114 and apply it to the body 112 of a conventional thermal break.

For all embodiments, it is possible to have standard profiles in stock and then add communication lines 108 (FIG. 1) later to convert the profile into an "active" profile upon ordering. Moreover, in some embodiments, the inner space 104 (FIG. 1) may be defined by the beading of a fenestration window assembly. In such embodiments, the communication lines 108 may be arranged within the inner space 104 defined by the beading.

Figure 5:
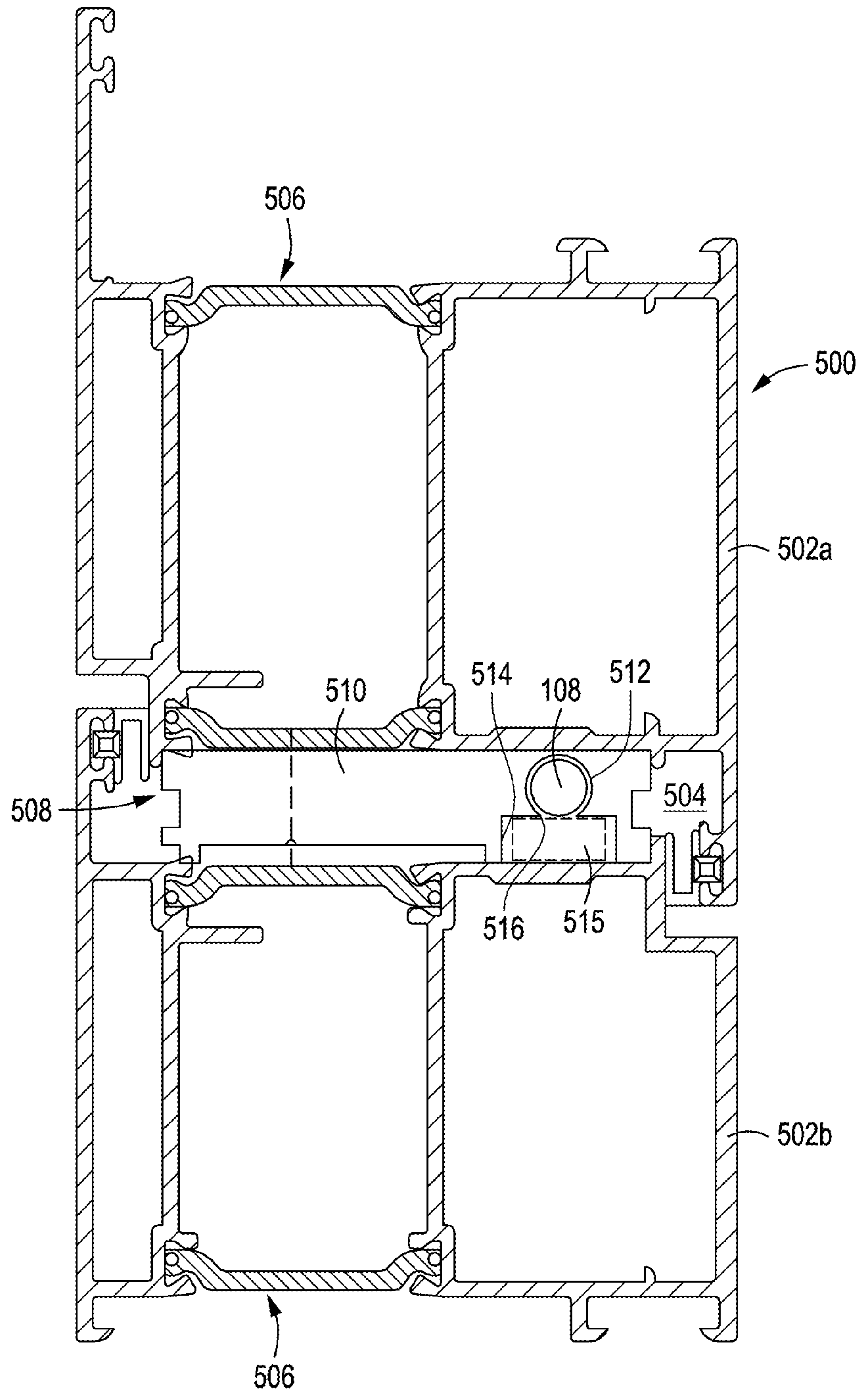
FIG. 5 is a cross-section view of a further example profile, according to one or more embodiments.

FIG. 5 is a cross-section view of another example profile 500, according to one or more embodiments. The profile 500 may form part of or otherwise be incorporated into any type of commercial or residential fenestration system including, but not limited to, windows, doors, curtain wall assemblies, conservatories, balconies, glazed roofing systems, sliding doors and windows, or any combination thereof. The profile 500 may be a designed to be oriented vertically, horizontally, or at any angle therebetween.

As illustrated, the profile 500 can include a first or "vent" portion 502*a* intended to enclose a building envelope, and a second or "frame" portion 502*b* intended to enclose the vent portion 502*a* and/or mate the vent portion 502*a* with the building. In some embodiments, the vent portion 502*a* may be a vent, sash, or panel of a fenestration unit while the frame portion 502*b* may be a frame or enclosing structure for the fenestration unit secured within an opening provided in the building. A gap or inner space 504 may be defined between the vent and frame portions 502*a,b* such that a gasket or additional sealing mechanism may be applied.

The vent and frame portions 502*a,b* may include conventional thermal breaks 506, such that the profile 500 represents a fenestration unit without modified thermal breaks (e.g., the thermal break 106). Alternatively, a retention mechanism 508 may be arranged between the vent and frame portions 502*a,b* and otherwise positioned within the inner space 504. The retention mechanism 508 may be configured to secure and otherwise house one or more communication lines 108 that extend within (through) the profile 500. As discussed above, the communication lines 108 may comprise a variety of means for transmitting electrical power, signals, and data.

In the illustrated embodiment, the retention mechanism 508 is mounted to the vent portion 502*a*. In such embodiments, when the frame portion 502*b* is secured to the vent portion 502*a*, the retention mechanism 508 will be secured between the two portions 502*a,b*. In other embodiments, however, it is contemplated herein that the retention mechanism 508 may alternatively be mounted to the frame portion 502*b*. In further embodiments, separate retention mechanisms 508 may be mounted on both the vent and frame portions 502*a,b*.

In the illustrated embodiment, the retention mechanism 508 comprises a thermal shield extending across a width of the vent portion 502*a*. The thermal shield serves to improve thermal performance of the profile 500 by preventing thermal energy loss between the vent and frame portions 502*a,b* and in some cases providing mechanical strength. The thermal shield may additionally be used to improve weathering performance of the profile 500. Further, the thermal shield may further serve to retain one or more components of the profile 500 or to attach components (e.g., hardware) to the profile 500, and may be mated to the internal or frame portions 502*a,b* via one or more mechanical fasteners, a snap-fit engagement, a magnetic attachment, an adhesive, an interference fit, a welded interface, a hook and loop fastener, a threaded fastener, or any combination thereof. The thermal shield may be made of one or more materials having a thermal conductivity that is less than the thermal conductivity of the profile 500, such as acrylonitrile butadiene styrene (ABS), PET, nylon, or the like.

For purposes of discussion, the retention mechanism 508 will be referred to herein as the "thermal shield 508". In the illustrated embodiment, the thermal shield 508 comprises an elongate body 510 which is attached or coupled to the vent portion 502*a*. The elongate body 510 may define a first cavity 512, in which the communication line(s) 108 may be disposed. While only one first cavity 512 and one corresponding communication line 108 is shown in the thermal shield 508, it is contemplated herein that a plurality of first cavities 512 and corresponding communication lines 108 may be included in the thermal shield 508.

The first cavity 512 may be defined throughout the length of the thermal shield 508, such that the communication lines 108 may be run around a perimeter of the vent portion 502*a*. As previously discussed, a thermal shield 508 may be alternatively or additionally included on the frame portion 502*b* such that communication lines 108 may be run around a perimeter of the frame portion 502*b*. Thus, in some embodiments, the communication lines 108 may be run around the perimeter of an existing passive fenestration unit, or around the perimeter of the frame of the existing passive fenestration unit.

The first cavity 512 may be in communication with a second cavity 514 which enables external access to the first cavity 512. Accordingly, the communication line 108 may be received within the first cavity 512 via the second cavity 514. The second cavity 514 may be rectangular in shape, as illustrated, or may be defined in a further complex shape for retention of additional components. In some embodiments, a seal or gasket 515 (shown as a dashed box) may be received within the second cavity 514. The gasket 515 may help prevent fluid migration across the profile 500, but may also help retain the communication lines 108 within the first cavity 512.

The first and second cavities 512, 514 may be connected via an interface 516, depending upon the geometry of the first and second cavities 512, 514. As illustrated, the first cavity 512 may exhibit a circular or rounded profile such that the interface 516 is narrowed similar to the opening 204 of FIG. 2B. The narrowed interface 516 may aid in retention of the communication line(s) 108. In alternate embodiments, however, the first cavity 512 may exhibit a semi-circular or rectangular profile such that the interface 516 is not narrowed (e.g., the grooves 202 of FIG. 2A). In such embodiments, the gasket 515 may help retain the communication line 108 within the first cavity 512. In yet other embodiments, the second cavity 514 may be replaced with a cap similar to the caps 114 of FIGS. 2A-2D, 3A-3C, and 4A-4B to protect the communication line(s) 108.

In some embodiments, the elongate body 510 may be formed of a material with elastic properties, such that the elongate body 510 may be temporarily flexed without permanent deformation. In these embodiments, a force may be applied to flex the elongate body 510 and expand the first cavity 512 for accepting the communication lines 108. The elongate body 510 may be unflexed such that the first cavity 512 encloses the communication lines 108 and may thus be retained within the thermal shield 508. In further embodiments, a force may be applied to the communication lines 108 such that an interference fit is generated within the first cavity 512 for retention within the thermal shield 508.

As discussed above, the thermal shield 508 may be installed onto an existing passive fenestration unit such that the thermal breaks 506 are unmodified. In some embodiments, the thermal shield 508 may be retrofit and attached to the vent portion 502*a* for running the communication lines 108 on an existing passive system. Accordingly, the thermal shield 508 can be provided as an integral part of the internal or frame portions 502*a,b* during manufacture, or can be fit to an existing passive system on-site, thus enabling running of communication lines 108 on any system.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

What is claimed is:

1. A profile for a fenestration system, comprising:

a first portion and a second portion offset from the first portion and thereby defining an inner space therebetween, wherein the first portion is an exterior portion exposed to an exterior of the building, and the second portion is an interior portion exposed to an interior of the building;

a retention mechanism arranged within the inner space, the retention mechanism including:

an elongate base body extending between and interconnecting the first and second portions;

a cap attachable to the body; and a cavity defined between the body and the cap when the cap is attached to the body; and one or more communication lines mounted to the retention mechanism and housed within the cavity, wherein one or more grooves are defined in a material of the body and are sized to receive and accommodate the one or more communication lines, and wherein the one or more grooves extend from the cavity, and wherein at least one of the one or more grooves includes an opening and exhibits a width that progressively narrows from the opening as the groove extends into the body.

2. The profile of claim 1, wherein the retention mechanism comprises a thermal break.

3. The profile of claim 1, further comprising a pivot mechanism provided at a first end of the cap to pivotably attach the cap to the body.

4. The profile of claim 3, wherein the pivot mechanism comprises a living hinge.

5. The profile of claim 3, further comprising an attachment mechanism provided at a second end of the cap, wherein the attachment mechanism detachably couples the cap to the body.

6. The profile of claim 1, wherein a top face of the cap aligns with a top face of an adjacent portion of at least one of the first and second portions.

7. The profile of claim 1, wherein the one or more grooves are defined in the body within the cavity.

8. The profile of claim 1, further comprising first and second attachment mechanisms provided at opposing ends of the cap to detachably couple the cap to the body.

9. The profile of claim 8, wherein the cap is made of a material different from the body.

10. A profile for a fenestration system comprising:

a first portion and a second portion offset from the first portion and thereby defining an inner space therebetween, wherein the first portion is an exterior portion exposed to an exterior of the building, and the second portion is an interior portion exposed to an interior of the building;

a retention mechanism arranged within the inner space, the retention mechanism including:

an elongate base body extending between and interconnecting the first and second portions;

a cap attachable to the body; and a cavity defined between the body and the cap when the cap is attached to the body; and one or more communication lines mounted to the retention mechanism and housed within the cavity, wherein one or more grooves are defined in a material of the body of the retention mechanism and are sized to receive and accommodate the one or more communication lines, and wherein one or more protrusions are defined opposite the one or more grooves on an opposing side of the body.

11. The profile of claim 10, wherein at least one of the one or more grooves provides an opening that narrows to retain the one or more communication lines within the at least one of the one or more grooves.

12. A method of converting a profile that includes a first portion and a second portion offset from the first portion and thereby defining an inner space therebetween, wherein the first portion is an exterior portion exposed to an exterior of a building, and the second portion is an interior portion exposed to an interior of the building, wherein the method includes:

mounting one or more communication lines to a retention mechanism arranged within the inner space, the retention mechanism including:

an elongate base body extending between and interconnecting the first and second portions;

a cap attachable to the body;

a cavity defined between the body and the cap when the cap is attached to the body; and one or more grooves defined in a material of the body or the cap and extending from the cavity, wherein each groove is sized to receive and accommodate a corresponding communication line from the one or more communication lines, and wherein at least one of the one or more grooves includes an opening and exhibits a width that progressively narrows from the opening as the groove extends into the body;

wherein the mounting one or more communication lines comprises:

retaining a communication line from the one or more communication lines in a corresponding groove of the one or more grooves.

13. The method of claim 12, wherein the retention mechanism comprises a thermal break.

14. A profile for a fenestration system, comprising:

a frame portion defining a portion of a building envelope and including a first thermal break;

a vent portion offset from the frame portion and including a second thermal break, wherein the vent portion is movable relative to the frame portion to mate with the frame portion and thereby enclose the portion of the building envelope;

a retention mechanism arranged within an inner space defined between the frame and vent portions when the vent portion mates with the frame portion and interposing the first and second thermal breaks, the retention mechanism including an elongate body extending across a width of the profile and attached to at least one of the frame or vent portions, wherein the retention mechanism defines a cavity; and one or more communication lines received within the cavity.

15. The profile of claim 14, wherein the cavity is a first cavity in communication with a second cavity defined within the elongate body, and wherein the second cavity is sized to receive a gasket operable to prevent fluid migration into the first cavity.

16. The profile of claim 14, wherein the retention mechanism is integral with the vent portion or the frame portion.

17. A profile for a fenestration system, comprising:

a first portion and a second portion offset from the first portion and thereby defining an inner space therebetween, wherein the first portion is an exterior portion exposed to an exterior of the building, and the second portion is an interior portion exposed to an interior of the building;

a retention mechanism arranged within the inner space, the retention mechanism including:

an elongate base body extending between and interconnecting the first and second portions;

a cap attachable to the body; and a cavity defined between the body and the cap when the cap is attached to the body, wherein a groove is defined in a material of the cap of the retention mechanism and is sized to receive and accommodate a communication line.

18. The profile of claim 17, wherein at least one of the one or more grooves provides an opening that narrows to retain the wire within the at least one of the one or more grooves.

19. The profile of claim 17, wherein at least one of the one or more grooves narrows as it extends into the body.

* * * * *